Figure 1:
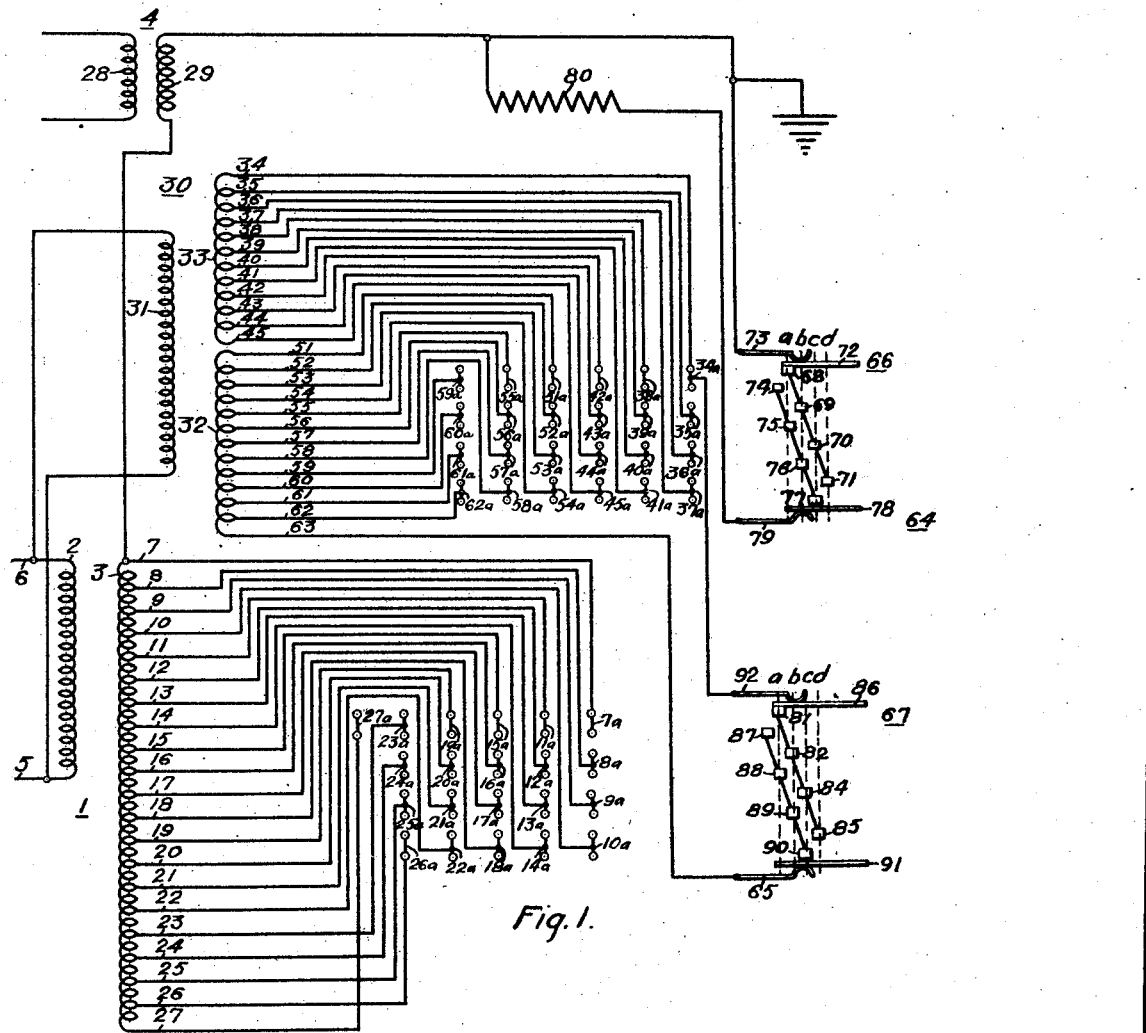

E. LEHR.
VOLTAGE REGULATOR SYSTEM.
APPLICATION FILED JUNE 25, 1919.

1,419,458.

Patented June 13, 1922.

WITNESSES:
J. A. Helsel
W. B. Wells

INVENTOR
Edwin Lehr
BY
Wesley G. Carr
ATTORNEY

UNITED STATES PATENT OFFICE.

EDWIN LEHR, OF WILKINSBURG, PENNSYLVANIA, ASSIGNOR TO WESTINGHOUSE ELECTRIC AND MANUFACTURING COMPANY, A CORPORATION OF PENNSYLVANIA.

VOLTAGE-REGULATOR SYSTEM.

1,419,458. Specification of Letters Patent. Patented June 13, 1922.

Original application filed March 7, 1916, Serial No. 82,625. Divided and this application filed June 25, 1919. Serial No. 306,689.

*To all whom it may concern:*

Be it known that I, EDWIN LEHR, a citizen of the United States, and a resident of Wilkinsburg, in the county of Allegheny and State of Pennsylvania, have invented a new and useful Improvement in Voltage-Regulator Systems, of which the following is a specification, this application being a division of application Serial No. 82,625, filed March 7, 1916.

My invention relates to regulator systems and particularly to voltage-regulator systems.

One object of my invention is to provide a voltage-regulator system that shall effect the transfer of the connections of a circuit from one transformer tap to an adjacent transformer tap for varying the voltage impressed upon such circuit without any abrupt circuit changes.

Heretofore, it has been common to regulate and vary the voltage of an alternating current by means of a regulating transformer which comprised a plurality of winding-sections formed by taps regularly spaced on the transformer winding and using an induction potential regulator in parallel to the individual winding-sections of the regulating transformer to give a smooth and gradual change in the voltages as the circuit connections to the regulating transformer winding were varied from one tap to another. Because of the limited range of variations in voltage that can be effected by an induction potential regulator, the regulating transformer was, of necessity, provided with a very large number of sections, each individual section effecting a very limited change in the voltage impressed upon the regulated circuit, because of the voltage-range restriction imposed by the induction potential regulator.

In order to overcome the above difficulty, I substitute an auxiliary transformer having two floating coils for the induction potential regulator, and provide means for alternately connecting the floating coils to successive taps extending from the main or regulating transformer so as to vary the number of main-transformer sections that are included in the regulated circuit.

In practicing my invention a main or regulating transformer, having a primary winding connected across a supply circuit and a secondary winding divided into sections by taps extending from it, is provided for supplying a variable voltage to an auxiliary circuit or to any auxiliary apparatus, such as a testing transformer. In order to change the connection of the primary winding of the testing transformer from one main-transformer tap to another main-transformer tap, an auxiliary transformer is provided which comprises a primary winding connected across the supply circuit and a secondary winding having two coils divided into sections by taps.

The changing of the testing-transformer connection, by said auxiliary transformer from one main-transformer tap to an adjacent transformer tap for varying the number of main transformer sections included in circuit with the testing transformer, is effected by connecting one terminal of the primary winding of the testing transformer directly to one terminal of the secondary winding of the main transformer and changing the connection of the second terminal of the testing transformer through the floating coils of the auxiliary transformer from one main-transformer tap to an adjacent main-transformer tap.

In changing from one main-transformer tap to an adjacent transformer tap for including a section of the main transformer in circuit with the testing transformer to raise the voltage impressed upon the testing transformer, the sections of one of the auxiliary-transformer floating coils are successively connected in circuit with the testing transformer to impress a voltage on the testing transformer equivalent to one-half the voltage obtaining between two adjacent transformer taps. Then the two floating coils of the auxiliary transformer are bridged across one section of the main transformer so that the current supplied by the main transformer section may flow through either one of the floating coils to the transformer secondary winding. No change in the voltage impressed upon the testing transformer is effected at this time, inasmuch as the second floating coil is connected to the second main transformer tap to develop an opposition voltage equivalent to one-half the voltage obtaining between two main transformer taps. Finally, the first floating coil is excluded from circuit and the sections of the second floating coil are successively excluded from circuit to connect the selected main-transformer section directly in circuit with the testing transformer.

A controller, having a drum associated with the taps extending from the floating coils of the auxiliary transformer and a second drum associated with the taps extending from the secondary winding of the main transformer, is provided for changing the connections of the transformers to vary the sections of the main transformer which are included in circuit with the testing transformer. The two drums are preferably operated by an electric motor and are so geared together that the drum associated with the floating coil makes one complete revolution for each position occupied by the drum which is connected to the main-transformer taps.

Figure 2:
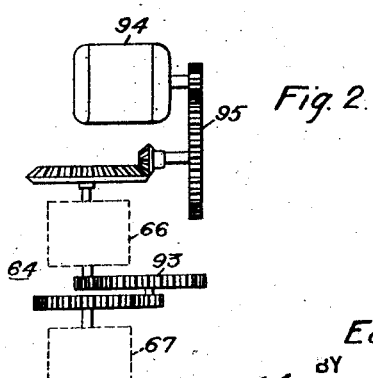

In the accompanying drawing, Figure 1 is a diagrammatic view of a regulator system embodying my invention and Fig. 2 is a diagrammatic view of the means for operating the controller illustrated in Fig. 1.

Referring to the drawing, a main transformer 1, having a primary winding 2 and a secondary winding 3, is provided for governing the voltage impressed upon a testing transformer 4. The primary winding 2 of the main transformer 1 is directly connected across a supply circuit comprising conductors 5 and 6, and the secondary winding 3 of the main transformer 1 is divided into sections by means of taps 7 to 27, inclusive. The testing transformer 4 comprises a secondary winding 28 and a primary winding 29, one terminal of the primary winding 29 being directly connected to the main transformer tap 7.

An auxiliary transformer 30, comprising a primary winding 31 connected across the supply conductors 5 and 6 and two secondary floating coils or windings 32 and 33, is provided for switching a testing-transformer connection from one main transformer tap to an adjacent main transformer tap without any abrupt circuit changes. The floating coil 33 is divided into sections by means of taps 34 to 45, inclusive, and the floating coil 32 is divided into sections by means of taps 51 to 63, inclusive. The taps 34 to 45, inclusive, extending from the floating coil 33, are respectively connected to contact fingers 34a to 45a, inclusive, of a controller 64, and the taps 51 to 62, inclusive, extending from the floating coil 32, are respectively connected to the contact fingers 51a to 62a of the controller 64. The tap 63, extending from the floating coil 32, is directly connected to a switch arm 65 of the controller 64. The transformer taps 7 to 27, inclusive, extending from the secondary winding 3 of the main transformer 1, are respectively connected to the stationary contact fingers 7a to 27a, inclusive, of the controller 64.

The controller 64 embodies a drum 66, which controls the circuit connections of the auxiliary transformer 30, and a drum 67, which governs the connections of the taps extending from the secondary winding 3 of the main transformer. The drum 66 comprises a plurality of contact segments 68 to 71, inclusive, which are electrically connected to a slip ring 72 and to a brush 73, which engages the slip ring 72 at all times. A plurality of contact segments 74 to 77, inclusive, are electrically connected to a slip ring 78, which is in engagement with a brush 79 at all times. The brush 73 is directly connected to one terminal of the secondary winding 29 of the testing transformer 4, and the brush 79 is connected to the same transformer terminal through a resistor 80. The contact segments 68 and 74 are adapted to engage the stationary contact fingers 34a, 38a, 42a, 51a, 55a and 59a, according to the position of the drum 66. The contact segments 69 and 75 are adapted to engage the contact fingers 35a, 39a, 43a, 52a, 56a and 60a, according to the position of the drum 66 and, likewise, the contact segments 70 and 76 and 71 and 77 are, respectively, adapted to engage the stationary contact fingers 36a, 40a, 44a, 53a, 57a and 61a and the stationary contact fingers 37a, 41a, 45a, 54a, 58a and 62a.

The contact fingers 37a to 45a, inclusive, which are connected to the taps 34 to 45, inclusive, extending from the floating coil 33, are disposed in three rows to be successively engaged by the contact segments of the drum 66. The first row of stationary contact fingers embodies the contact fingers 34a, 35a, 36a and 37a and are successively engaged by the movable contact segments of the drum 66 during a partial rotation by it. The three rows of stationary contact members are peripherally disposed around the drum 66 so that, after the successive engagement of the drum contact segment with the stationary contact fingers 34a to 37a, the contact fingers 38a to 41a, comprising the second vertically alined group, are successively engaged by the drum contact segments and, finally, the stationary contact fingers 42a to 45a, comprising the third vertically alined group of contact fingers, are successively engaged by the contact segments of the drum 66. Adjacent to the three vertically alined groups of contact fingers 34a to 45a, inclusive, are disposed three vertically alined groups of contact fingers 51a to 62a, which are respectively connected to the taps 51 to 62, inclusive, extending from the floating coil 32. The vertically alined groups of contact fingers respectively comprise contact fingers 51a to 54a, inclusive, the contact fingers 55a to 58a, inclusive, and the contact fingers 59a to 62a, inclusive. Such vertically alined groups of contact fingers are successively engaged by the contact segments of the drum 66 in the same manner as the contact fingers which are connected to the taps extending from the floating coil 33. These vertically alined groups of stationary contact fingers are symmetrically so disposed around the contact drum 66 that the contact fingers 34a to 45a, inclusive, and 51a to 62a, inclusive, are successively engaged by the contact fingers during one complete revolution of the drum 66.

The drum 67 comprises contact segments 81 to 85, inclusive, which are electrically connected to a slip ring 86 and contact segments 87 to 90, inclusive, which are electrically connected to a slip ring 91. The slip ring 91 is connected to the tap 63 extending from the floating coil 32 by means of the brush 65, and the slip ring 86 is connected to the tap 34, extending from the floating coil 30, by means of a brush 92.

The stationary contact fingers 7a to 27a, inclusive, are disposed in six peripherally spaced groups around the drum 67, the first group comprising contact fingers 7a to 10a, the second group comprising the contact fingers 11a to 14a, inclusive, the third group comprising the contact fingers 15a to 18a, inclusive, the fourth group comprising the contact fingers 19a to 22a, inclusive, the fifth group comprising the contact fingers 23a to 26a, inclusive, and the sixth group comprising the finger 27a. The drum 67, during a complete revolution, successively completes circuits to each of the stationary contact fingers 7a to 27a, inclusive, in a manner similar to the operation of the drum 66.

The drums 66 and 67 are interconnected by a gearing system 93 so that the drum 66 makes one complete revolution during the time that the drum 67 is passing from one position to an adjacent position. The two drums are connected to a motor 94 in any suitable manner, as by means of a gearing system 95. The construction and operation of the drums 66 and 67 are more completely described in my co-pending application Serial No. 82,625, filed March 7, 1916, of which this application is a division.

In case it is desired to energize the testing transformer 4 and gradually increase the voltage impressed upon it, the motor 94 is energized to rotate the drums 66 and 67 in a clockwise direction. Assuming the drum 67 to be in such position that the contact segment 81 engages the contact finger 7a, a circuit is completed through the testing transformer 4, upon engagement between the contact segment 68 and the contact finger 34a, which extends from one terminal of the secondary winding 3 through the secondary winding 29 of the testing transformer 4, brush 73, slip ring 72, contact segment 68, contact finger 34a, brush 92, slip ring 86, contact segment 81 and the contact finger 7a to the tap 7 extending from secondary winding 3 of the main transformer 1. At this time, no voltage is impressed upon the testing transformer 4, inasmuch as no portion of the auxiliary transformer 30 or of the main transformer 1 is included in circuit with the secondary winding 29 of the testing transformer. Upon continued rotation of the drum 66, the contact segment 75 engages the stationary contact finger 35a and completes a circuit which extends from one terminal of the secondary winding 3 through the secondary winding 29, resistor 80, brush 79, slip ring 78, contact segment 75, contact finger 35a, taps 35 and 34, extending from the coil 30, brush 92, slip ring 86, contact segment 81, and the contact finger 7a to the tap 7 extending from the secondary winding 3. Further rotation of the drum 66 effects engagement between the contact segment 69 and the contact finger 35a for short-circuiting the resistor 80 to impress the voltage obtaining between the taps 34 and 35 of the floating coil 33 upon the secondary winding 29 of the transformer 4.

The continued movement of the drum 66 effects engagement between the contact segment 76 and the contact finger 36a. The engagement between the segment 76 and the finger 36a completes a circuit through the secondary winding 29 of the testing transformer 4, which includes the preventive resistance 80 and the two sections of the coil 33 that are included between the taps 34 and 36. It will be noted that the portion of the coil 33 included between the taps 35 and 36 is short-circuited by the simultaneous engagement between the contact finger 35a and the contact segment 69 and the contact finger 36a and the contact segment 76, but such short-circuit causes no damage inasmuch as the preventive resistance 80 is included in circuit. Upon disengagement of the contact segment 69 and the contact finger 35a, the contact segment 70 engages the contact finger 36a to short-circuit the preventive resistor 80 and impresses the voltage obtaining between the taps 34 and 36 of the coil 33 upon the testing transformer.

When the drum 66 has rotated through thirty degrees and the contact segment 71 is in engagement with the contact finger 45a, the complete floating coil 33 is connected in circuit with the testing transformer 4 to impress a voltage upon the testing transformer which is equivalent to one-half the voltage obtaining between any two adjacent taps of the main transformer 1.

Upon further rotation of the drums 66 and 67, the contact segment 88 of the drum 67 engages the contact finger 8a, and the contact segment 74 of the drum 66 engages the contact finger 51a. In this position, two circuits are completed for energizing the secondary winding 29. The first circuit, which includes the coil 33, extends from one terminal of the secondary winding 3 through the secondary winding 29 of the testing transformer, brush 73, slip ring 72, contact segment 71, contact finger 45a, complete coil 33, brush 92, slip ring 86, contact segment 81, and the contact finger 7a to the tap 7 extending from the secondary coil 3. The second circuit includes the portion of the secondary winding 3 between the taps 7 and 8 and field winding 32 and extends from one terminal of the secondary winding 3 through the secondary winding 29 of the testing transformer, resistor 80, brush 79, slip ring 78, contact segment 74, contact finger 51a, complete coil 32, brush 65, slip ring 91, contact segment 88 and the contact finger 8a to the tap 8 extending from the secondary winding 3 of the main transformer 1. Although a complete section of the secondary winding 3 is included in the second circuit traced, the voltage impressed upon the testing transformer is only one-half the voltage obtaining across any section of the main transformer 1, inasmuch as the coil 32 develops an opposition voltage equivalent to one-half the voltage obtaining across any two taps of the main transformer 1.

Further rotation of the drums excludes the coil 33 from circuit by disengagement between the contact finger 71 and 45a and then the resistor 80, which is in circuit with the coil 32, is short-circuited by engagement with the contact segment 68 and the contact finger 51a. The continued rotation of the drum 66 successively excludes the sections of the coil 32 from circuit until the complete voltage of the section of the secondary winding 3 included between the taps 7 and 8 is impressed upon the testing transformer.

In a like manner, the successive segments of the secondary winding 3 of the main transformer 1 are connected in circuit with the testing transformer 4. Moreover, if it is desired to reduce the voltage impressed upon the testing transformer 4, the drums 66 and 78 are rotated in a counter-clockwise direction to perform a reverse operation of that above described and successively exclude sections of the secondary winding 3 from the circuit of the testing transformer 4.

From the foregoing explanation as to the operation of the regulator system, it will be noted that, in changing from one main transformer tap to an adjacent transformer tap to vary the number of main transformer sections included in circuit with the testing transformer 4, the sections of the coil 33 are successively connected in circuit with the secondary winding 29 of the testing transformer; next, the two coils 33 and 32 are bridged across one section of the main transformer 1, the voltage of the coil 32 opposing the voltage of the main transformer 1, then the winding 33 is excluded from circuit and, finally, the sections of the coil 32 are successively excluded from the circuit of the testing transformer 4. In this manner, a very wide range of voltage regulation is provided and also slight variations therein are made, the former being accomplished by the main transformer 1 and the latter by the auxiliary transformer 30.

Modifications in the system and arrangement and location of parts may be made within the spirit and scope of my invention, and such modifications are intended to be covered by the appended claims.

I claim as my invention:

1. The combination with a main electrical winding comprising a plurality of sections formed by taps, and an auxiliary winding comprising a plurality of differentially related coils composed of sections formed by taps, of means for connecting various combinations of the auxiliary winding sections in circuit with all the sections of the main winding in succession.

2. The combination with a main electrical winding and an auxiliary winding comprising a plurality of sections formed by taps, both of said windings being excited with electrical energy from common supply mains, of a controller comprising a plurality of stationary groups of contact fingers which are severally connected to the taps on said windings, drums severally associated with each of said windings, and speed-modifying means for interconnecting said drums to successively connect the several sections of the auxiliary winding in circuit with succeeding sections of the main winding.

3. The combination with a main winding and an auxiliary winding, the main winding comprising a plurality of sections formed by taps and the auxiliary winding comprising two coils divided into sections by taps, of a controller comprising groups of spaced contact fingers which are connected to the taps on the main winding, a drum therefor to vary the circuit connections of the main winding, a second group of spaced contact fingers which are connected to the taps on the auxiliary winding, a second drum therefor for varying the circuit connections of the auxiliary winding to the main winding drum, and a gear train inserted between said drums for effecting a speed variation in the rotation of the drums.

4. The combination with a main winding and an auxiliary winding, each comprising a plurality of sections formed by taps, of a controller comprising a group of spaced contact fingers which are connected to the taps on the main winding, a second group of spaced contact fingers which are connected to the taps on the auxiliary winding, a separate drum for each of said groups of contact fingers for varying the circuit connections of the auxiliary winding to the main winding, and means for varying the circuit connections of said windings at different rates.

5. In a regulator system, the combination with a main transformer having a plurality of sections formed by taps, an auxiliary transformer having two coils, each of said coils having a plurality of sections formed by taps, and means for successively connecting the sections of one of said auxiliary coils in circuit with one of said main transformer taps, connecting the two auxiliary coils to two of the main transformer taps, excluding the first auxiliary transformer coil from circuit and successively excluding the sections of the second auxiliary coil from circuit.

6. In a regulator system, the combination comprising a main winding having a plurality of sections formed by taps, an auxiliary winding comprising two coils having a plurality of sections, and means for successively connecting the sections of one of said coils in circuit with one of said main-winding taps for connecting the other of said coils to one of said main winding taps, for disconnecting the first coil from circuit and for disconnecting the other one of said coils from circuit.

7. In a regulator system, the combination with a supply circuit, a main transformer having a plurality of sections formed by taps, and an auxiliary transformer comprising two differentially related coils composed of sections formed by taps, of means for successively connecting the several sections of the auxiliary transformer in circuit with all the sections of the main transformer.

8. In a regulator system, the combination with a supply circuit, and a main transformer having a primary and a secondary winding, the primary winding being connected across the supply circuit and the secondary winding having a plurality of sections formed by taps, of an auxiliary transformer having a primary winding connected across the supply circuit and a secondary winding comprising two coils divided into sections by taps extending from them, a testing transformer having a primary and a secondary winding, means for connecting the primary winding of the testing transformer in circuit with the secondary winding of the main transformer and for connecting the auxiliary-winding sections successively in circuit to include various main-transformer sections without any abrupt circuit changes.

9. In a regulator system, the combination with a supply circuit, a main transformer having a primary winding connected across the supply circuit and a secondary winding divided into sections by taps, an auxiliary transformer having a primary winding connected across the supply circuit and two secondary coils divided into sections by taps, and a testing transformer, of means for successively connecting the sections of one of said secondary auxiliary coils in series with the testing transformer, connecting the two auxiliary secondary coils in circuit with the testing transformer and one section of the main transformer, disconnecting the first auxiliary coil from circuit and connecting the second auxiliary coil directly in series with the testing transformer and the main winding section, and successively excluding the sections of the second coil of the auxiliary transformer from circuit.

10. The method of changing a working-circuit connection from one main transformer tap to an adjacent transformer tap for varying the number of main transformer sections included in circuit which consists in successively connecting the sections of a floating coil to said working circuit, connecting a second floating coil in parallel to the first floating coil for bridging one section of the main transformer, excluding the first floating coil from circuit, and successively excluding the various sections of the second floating coil from circuit.

11. In a regulating system having a main transformer divided into sections by taps and an auxiliary transformer comprising two coils divided into sections by taps, the method of changing the connection of a working circuit to the main transformer which consists in successively connecting the sections of one of said coils to said circuit, connecting said two auxiliary coils in parallel with a main transformer section to said circuit, excluding the first auxiliary coil from circuit, and successively excluding the sections of the second auxiliary coil from circuit.

12. The method of changing a working-circuit connection from one main-transformer tap to an adjacent transformer tap for varying the number of main-transformer sections included in circuit which consists in successively connecting the sections of an auxiliary coil to the working circuit and to the main transformer, connecting said first auxiliary coil and a second auxiliary coil respectively in shunt to and in series with one of the main transformer sections and to the working circuit, excluding the first auxiliary coil from circuit, and successively excluding the second auxiliary-coil sections from circuit.

13. In a regulator system, the combination with a supply circuit, a main transformer having a primary winding connected across the supply circuit and two floating secondary coils divided into sections by taps, and an auxiliary circuit, of means for successively connecting the sections of one floating coil to said auxiliary circuit, for bridging a main transformer section by said floating coils while connected to the auxiliary circuit, for excluding the first floating coil from circuit, and for successively excluding the sections of the second floating coil from circuit.

14. In a regulator system, the combination comprising a main transformer having a winding divided into sections by taps, two separate floating coils, a circuit, and means for connecting the main transformer to said circuit and for alternately connecting said floating coils to successive main transformer taps to vary the number of main transformer sections included in circuit.

15. In a regulating system, the combination comprising a supply circuit, a main transformer having a winding divided into sections by taps, an auxiliary transformer having two separate floating coils, both of said transformers being energized by the supply circuit, an auxiliary circuit, and means for connecting the main transformer to the auxiliary circuit and for alternately connecting said floating coils to successive main transformer taps to vary the number of main transformer sections included in circuit.

16. The combination with a main transformer having a plurality of taps extending from it, of means comprising an auxiliary transformer having two separate floating coils for changing circuit connections from one of said taps to another tap.

17. The combination with a main transformer having a plurality of taps extending from it, of means comprising two differentially related floating coils for changing circuit connections from one of said taps to another tap.

In testimony whereof, I have hereunto subscribed my name this 19th day of June 1919.

EDWIN LEHR.